(12) United States Patent
Yang et al.

(10) Patent No.: US 12,227,357 B2
(45) Date of Patent: Feb. 18, 2025

(54) ORDER PICKING METHOD AND DEVICE, AND STORAGE MEDIUM

(71) Applicant: SYRIUS ROBOTICS CO., LTD., Guangdong (CN)

(72) Inventors: Zhiqin Yang, Guangdong (CN); Qi Wan, Guangdong (CN)

(73) Assignee: SYRIUS ROBOTICS CO., LTD., Guangdong (CN)

( * ) Notice: Subject to any disclaimer, the term of this patent is extended or adjusted under 35 U.S.C. 154(b) by 873 days.

(21) Appl. No.: 17/425,957

(22) PCT Filed: Jan. 14, 2020

(86) PCT No.: PCT/CN2020/072025
§ 371 (c)(1),
(2) Date: Jul. 27, 2021

(87) PCT Pub. No.: WO2020/156149
PCT Pub. Date: Aug. 6, 2020

(65) Prior Publication Data
US 2022/0106119 A1    Apr. 7, 2022

(30) Foreign Application Priority Data

Jan. 30, 2019  (CN) .......................... 201910098942.0

(51) Int. Cl.
*B65G 1/137*  (2006.01)
*G06Q 10/087*  (2023.01)

(52) U.S. Cl.
CPC ......... *B65G 1/1371* (2013.01); *B65G 1/1373* (2013.01); *G06Q 10/087* (2013.01)

(58) Field of Classification Search
CPC .. B65G 1/1371; B65G 1/1373; G06Q 10/087; G06Q 10/047; G06Q 10/06316
See application file for complete search history.

(56) References Cited

U.S. PATENT DOCUMENTS 9,834,380 B2 * 12/2017 Hamilton ............. B65G 1/1373
10,954,067 B1 * 3/2021 Theobald ............... B25J 19/022
(Continued)

FOREIGN PATENT DOCUMENTS

CN    204856509 U    12/2015
CN    105572847 A    5/2016
(Continued)

OTHER PUBLICATIONS

CN priority application first search report issued on Apr. 2, 2024.

*Primary Examiner* — Michael Collins
(74) *Attorney, Agent, or Firm* — Samson G. Yu (57) ABSTRACT

The embodiments of the present disclosure relate to an order picking method and device, and a storage medium. The method includes: acquiring at least one piece of order information; acquiring information of at least one storage bin in a circulation box, wherein a plurality of storage bins are arranged in the circulation box; associating the at least one piece of order information with the information of the at least one storage bin, wherein the at least one piece of order information is in one-to-one correspondence with the information of the at least one storage bin; acquiring position information of all commodities, corresponding to the at least one piece of order information, in a commodity warehouse; determining an order picking path according to commodity information and the position information; and moving the circulation box in the commodity warehouse according to the order picking path for completing commodity picking.

15 Claims, 6 Drawing Sheets

(56) References Cited

U.S. PATENT DOCUMENTS

| | | | |
|---|---|---|---|
| 2004/0243278 A1* | 12/2004 | Leishman | G06Q 10/087 700/214 |
| 2005/0278062 A1* | 12/2005 | Janert | G06Q 10/08 700/214 |
| 2013/0317642 A1 | 11/2013 | Asaria et al. | |
| 2015/0081088 A1 | 3/2015 | Lyon | |
| 2016/0187886 A1 | 6/2016 | Jones et al. | |
| 2017/0158431 A1* | 6/2017 | Hamilton | G05B 19/41895 |
| 2017/0323253 A1 | 11/2017 | Enssle et al. | |
| 2017/0336780 A1* | 11/2017 | Wise | B65G 67/04 |
| 2018/0059635 A1 | 3/2018 | Johnson et al. | |
| 2018/0122032 A1 | 5/2018 | Asaria et al. | |
| 2018/0211347 A1 | 7/2018 | Chen | |
| 2019/0256290 A1* | 8/2019 | Hamilton | B65G 1/0492 |
| 2019/0287047 A1* | 9/2019 | Skaaksrud | B25J 9/163 |
| 2019/0310646 A1* | 10/2019 | DeJarnette | G06Q 10/087 |
| 2019/0388171 A1* | 12/2019 | Schermeier | G16H 40/63 |
| 2021/0221615 A1* | 7/2021 | Buchmann | B65G 1/1373 |
| 2021/0221616 A1* | 7/2021 | Fuentes | G06Q 10/0875 |

FOREIGN PATENT DOCUMENTS

| | | |
|---|---|---|
| CN | 205837747 U | 12/2016 |
| CN | 107215601 A | 9/2017 |
| CN | 107291083 A | 10/2017 |
| CN | 107633375 A | 1/2018 |
| CN | 108197873 A | 6/2018 |
| CN | 108398771 A | 8/2018 |
| CN | 109064279 A | 12/2018 |
| CN | 109886625 A | 6/2019 |
| CN | 209514191 U | 10/2019 |
| JP | 1993310308 A | 5/1992 |
| JP | 1999043211 A | 2/1999 |
| JP | 2002187605 A | 7/2002 |
| JP | 2004231370 A | 8/2004 |
| JP | 2007204176 A | 8/2007 |
| JP | 2008247546 A | 10/2008 |
| JP | 2016095542 A | 5/2016 |

* cited by examiner

ORDER PICKING METHOD AND DEVICE, AND STORAGE MEDIUM

CROSS REFERENCE

This application is a National Stage Filing of the PCT International Application No. PCT/CN2020/072025 filed on Jan. 14, 2020, which claims priority to Chinese Application No. 201910098942.0, the entirety of which is herein incorporated by reference.

TECHNICAL FIELD

The embodiments of the present disclosure relate to the field of intelligent order picking, and particularly relate to an order picking method and device, and a storage medium.

BACKGROUND

As the Internet and the mobile terminal are extensively popularized, consumers are more accustomed to frequently consuming anytime and anywhere. Therefore, for traditional e-commerce, efficient operation of warehousing is crucial for meeting the ever-increasing demands of consumers and providing good user experience under strong competition. E-commerce warehousing faces the challenges that the orders are exponentially increased while the commodity types of each order are fewer. When the number of pieces of order information is exponentially increased, the same commodities are highly likely to be present in a plurality of orders, so how to efficiently deal with the orders exponentially increased becomes an urgent problem to be solved.

In a solution adopted in the related art, a warehouse management system generally combines a plurality of orders into a bulk-order picking task according to a certain rule and then allocates the task to an order picker; after receiving the bulk-order picking task, a single order picker completes the task in a single round and assigns the task to a back-end sorter; and the sorter needs to divide the bulk-order picking task into a plurality of uncombined orders according to the instruction of the warehouse management system, and then the orders are packed and delivered by a packer.

However, in the solution adopted in the related art, the order picker picks orders back and forth, and order combination and division reduce the picking efficiency, which increases the burden of the whole process task and the labor cost and has low efficiency.

SUMMARY

Technical Problem

In view of this, in order to solve all or part of the technical problems, the embodiments of the present disclosure provide an order picking method and device, and a storage medium.

Solution to the Problem

Technical Solution

In a first aspect, the embodiments of the present disclosure provide an order picking method, including:

acquiring at least one piece of order information, wherein each piece of order information comprises information of at least one commodity;

acquiring information of at least one storage bin in a circulation box, wherein a plurality of storage bins are arranged in the circulation box;

associating the at least one piece of order information with the information of the at least one storage bin, wherein the at least one piece of order information is in one-to-one correspondence with the information of the at least one storage bin;

acquiring position information of all commodities, corresponding to the at least one piece of order information, in a commodity warehouse;

determining an order picking path according to commodity information and the position information; and moving the circulation box in the commodity warehouse according to the order picking path for commodity picking.

In a second aspect, the embodiments of the present disclosure provide an order picking device, including: a processor and a memory, wherein the processor is configured to execute an order picking program stored in the memory to implement the order picking method of the first aspect.

In a third aspect, the embodiments of the present disclosure provide a computer storage medium, storing one or more programs, wherein the one or more programs are executable by one or more processors to implement the order picking method of the first aspect.

BENEFICIAL EFFECT OF THE PRESENT DISCLOSURE

Beneficial Effect

According to the order picking solution provided by the embodiments of the present disclosure, after a plurality of pieces of order information and information of storage bins in a circulation box are acquired, the plurality of pieces of order information are associated with the information of the storage bins in one-to-one correspondence, and each storage bin may be used for accommodating all commodities corresponding to one order, which omits the trouble of combining the plurality of orders and sorting after the order picking, saves on labor, and improves efficiency.

In addition, position information of all commodities, corresponding to the plurality of pieces of order information, in the commodity warehouse is acquired, an order picking path is determined according to target commodity information and the position information, a robot is adopted to achieve order picking in place of a picking personnel, and the order picker only needs to wait, beside a commodity shelf, for the robot to bring the circulation box, then picks up commodities according to the displayed commodity information and position information of the commodities to be picked, and places the commodities into the corresponding storage bins of the circulation box to complete commodity picking, which further saves on time and labor, and improves the efficiency.

DETAILED DESCRIPTION OF THE EMBODIMENTS

For making the objectives, technical solutions and advantages of embodiments of the present disclosure more obvious, the technical solutions of the present disclosure will be clearly and completely described below in conjunction with the accompanying drawings in the embodiments of the present disclosure, and obviously, the described embodiments are some, rather than all of the embodiments of the present disclosure. Based on the embodiments of the present disclosure, all other embodiments acquired by those having ordinary skill in the art without making creative efforts shall fall within the scope of protection of the present disclosure.

For ease of understanding of embodiments of the present disclosure, exemplary embodiments will be provided for further explanation below in conjunction with the accompanying drawings, and the embodiments are not to be construed as limiting embodiments of the present disclosure.

Figure 1:
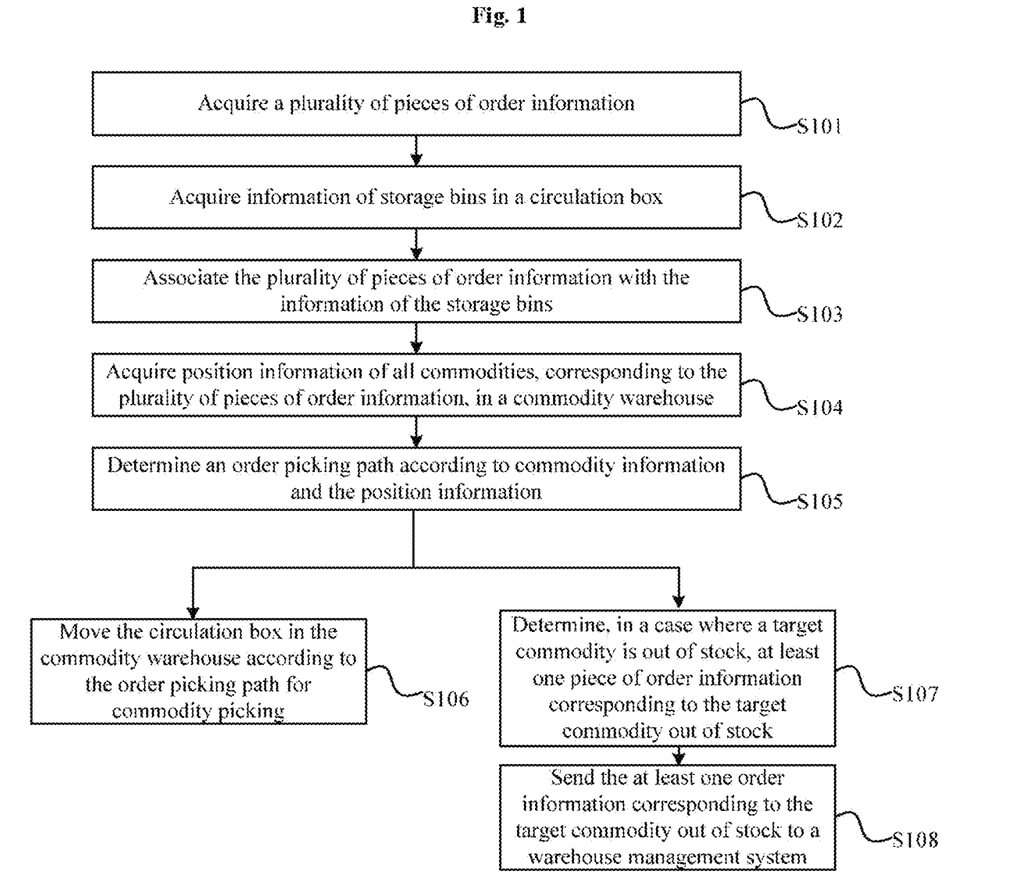
FIG. 1 is a schematic flowchart of an order picking method provided in an embodiment of the present disclosure.

FIG. 1 is a schematic flowchart of an order picking method provided in an embodiment of the present disclosure. As shown in FIG. 1, the method includes the following operations.

At S101, a plurality of pieces of order information are acquired.

The order picking solution provided by the embodiment of the present disclosure may be applied to the field of logistics (for example, order picking and delivering from a warehouse according to an order), and may also be applied to the fields of picking and dispensing medicines according to prescriptions in pharmacies, etc. The order picking solution may be executed by a robot, and other devices with a processor function may replace the robot to execute the order picking solution. In this embodiment, a robot is taken as an executer for ease of introduction.

A robot acquires a plurality of pieces of order information from a warehouse management system, wherein each piece of order information includes information of at least one commodity, for example, four pieces of order information (A, B, C, D) are acquired, wherein order A includes commodities e and f, order B includes commodity e, order C includes commodities e and h, and order D includes commodities f, g, and h.

S102, information of storage bins in a circulation box is acquired.

In this embodiment, a plurality of storage bins are arranged in the circulation box, and information of the storage bin may be configured on each storage bin. The circulation box may be, but is not limited to, a matrix container the interior of which is divided into a plurality of storage bins. The information of the storage bin configured on each storage bin may include, but is not limited to, at least one of: a two-dimensional code identifier, a serial number identifier, a color identifier, and a graphic identifier.

Figure 2:
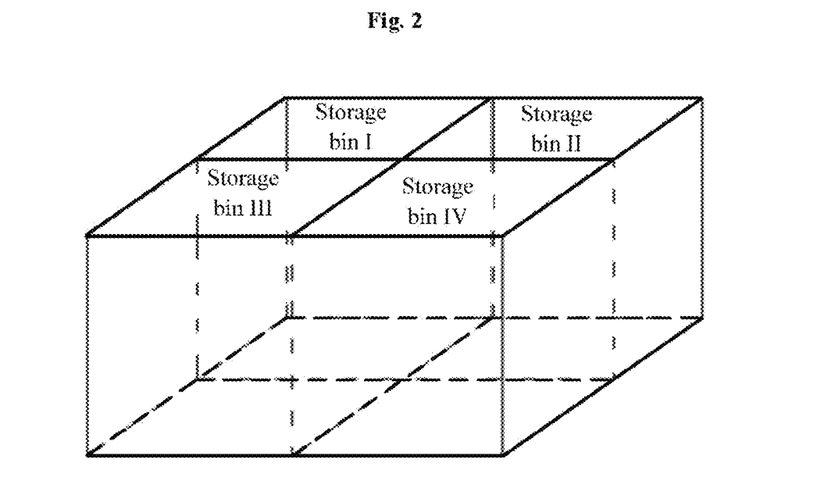
FIG. 2 is a schematic structural diagram of a circulation box involved in an embodiment of the present disclosure.

FIG. 2 is a schematic structural diagram of a circulation box involved in an embodiment of the present disclosure. As shown in FIG. 2, the circulation box is uniformly divided into four regions, and each individual region forms a storage bin. The information of the storage bin may be set at the bottom of each storage bin, or at a lateral surface of each storage bin.

It needs to be noted that a size of the circulation box and the number of storage bins in the circulation box may be set according to actual requirements, for example, eight storage bins, sixteen storage bins, etc., which is not specifically limited in the embodiment.

In an exemplary implementation of the present disclosure, the information of each storage bin may be one or more of the four identifiers, for example, a two-dimensional code identifier and a serial number identifier are set to jointly form the information of the storage bin.

For example, in the storage bins formed in FIG. 2, four storage bins are numbered as storage bin I, storage bin II, storage bin III and storage bin IV, two-dimensional code 1 and the number I are combined into the information of storage bin I, two-dimensional code 2 and the number II are combined into the information of storage bin II, two-dimensional code 3 and the number III are combined into information of storage bin III, and two-dimensional code 4 and the number IV are combined into the information of storage bin IV.

In addition to the above combination, other forms of combination may be used to generate and compose the information of the storage bin, which may be specifically set according to actual requirements, and is not specifically limited in the embodiment.

In this embodiment, besides the information of storage bins, a circulation box identifier may be configured on the circulation box, the information of all the storage bins in each circulation box and the circulation box identifier are stored, and when the information of any storage bin or the circulation box identifier is acquired, all information of the circulation box can be acquired.

The robot involved in the embodiment may be provided with a code scanner, so the information of the storage bins in the circulation box may be acquired in a code scanning mode. This operation may also be understood as the following: the circulation box is mounted by the robot and bound to the robot, and may specifically include:

the robot scans any one of the plurality of pieces of information of storage bins in the circulation box by means of the code scanner, and then all information of the circulation box can be obtained, for example, the number of the storage bins in the circulation box, the information of storage bin corresponding to each storage bin, etc.

At S103, the plurality of pieces of order information are associated with the information of the storage bins.

The robot associates the plurality of pieces of order information with the information of the storage bins. For example, in a case where there are four pieces of order information (A, B, C, D), and a circulation box containing four storage bins as shown in FIG. 2 is selected, the following operations may be performed to realize the association:

order information A is associated with storage bin I (that is, order information A can be obtained by scanning the information of storage bin I), order information B is associated with storage bin II (that is, order information B can be obtained by scanning the information of storage bin II), order information C is associated with storage bin III (that is, order information C can be obtained by scanning the information of storage bin III), and order information D is associated with storage bin IV (that is, order information D can be obtained by scanning the information of storage bin IV).

In addition to the above association relation, other modes may be used for association, for example, random association may be adopted to associate order information A with storage bin IV, which is not specifically limited in the embodiment.

In an exemplary implementation of the present disclosure, in a case where the number of pieces of order information is greater than the number of the storage bins of the circulation box, multiple pieces of order information of which the number is consistent with the number of the storage bins are selected from the plurality of pieces of order information in a preset sequence and are associated with the information of the storage bins, wherein the preset sequence may be a time sequence, a user priority sequence, etc.

For example, at present, ten orders need to be picked, but the circulation box has eight storage bins at most, so the ten orders may be arranged according to a generation time sequence of the orders, and the eight orders with the earliest generation time are selected to be associated with the eight storage bins of the circulation box.

In an exemplary implementation of the present disclosure, various circulation boxes with different numbers of storage bins may be set, for example, a circulation box with four storage bins, a circulation box with eight storage bins, a circulation box with ten storage bins and a circulation box with sixteen storage bins, and the purpose of setting the circulation boxes with different numbers of storage bins is enable the selection of a proper circulation box according to the number of orders, which improves the order allocation efficiency.

At S104, position information of all commodities, corresponding to the plurality of pieces of order information, in a commodity warehouse is acquired.

The robot queries the position information of all commodities, corresponding to the plurality of pieces of order information, in the commodity warehouse through the warehouse management system. Before executing this operation, the robot may determine the types of the commodities in the associated orders.

For example, four pieces of order information (A, B, C, D) include four types of commodities e, f, g, and h, and the four orders require three commodities e, two commodities f, one commodity g, and two commodities h.

The robot queries the position information of the commodities e, f, g and h through the warehouse management system.

The position information of each commodity at least includes one of: a commodity name, a storage position of the commodity, and the quantity (number) of the commodity.

For example, the commodity name is e, the storage position is shelf 001 in row 1 of region J, and the quantity of remaining commodities is 50.

At S105, an order picking path is determined according to commodity information and the position information.

The robot searches for warehouse coordinates corresponding to all commodity identifiers corresponding to the plurality of pieces of order information through the warehouse management system, and connects the warehouse coordinates corresponding to all the commodity identifiers in series according to a preset path to obtain the order picking path.

Figure 3:
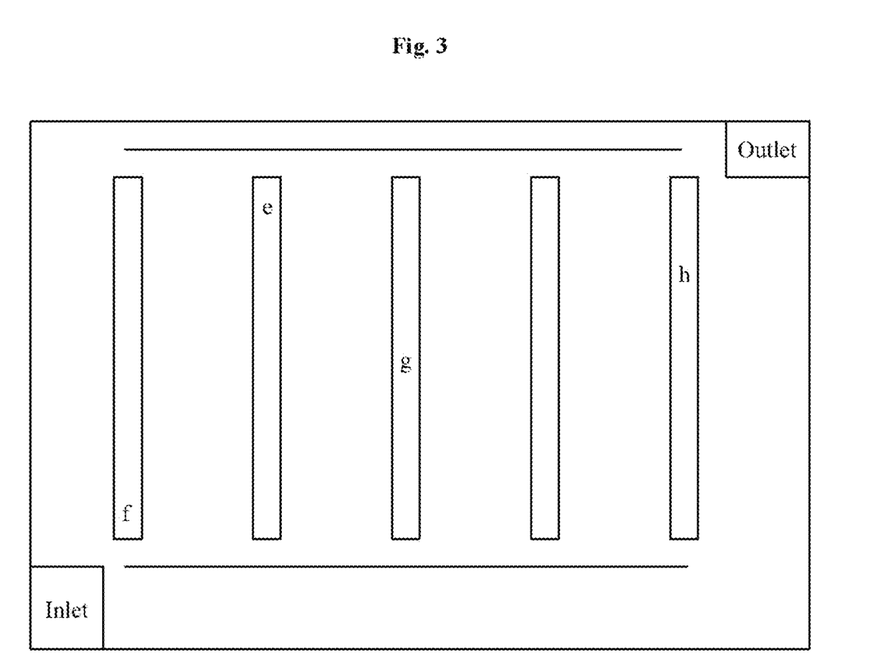
FIG. 3 is a schematic diagram of position information of a target commodity in a commodity warehouse according to an embodiment of the present disclosure.

As shown in FIG. 3, the order picking path may be planned according to a distance relation of the commodities, and the order picking path of the commodities e, f, g and h may be: f-e-g-h, that is, the robot reaches an order picking region of commodity f firstly, then an order picking region of commodity e, then an order picking region of commodity g, and finally an order picking region of commodity h, passes through an outlet and reaches a packing region.

At S106, the circulation box is moved in the commodity warehouse according to the order picking path for completing commodity picking.

The robot carries the circulation box to reach, according to the order picking path, the designated position of the commodity to be picked up. The connection between the robot and the circulation box may be in various situations, for example, the robot is provided with a component for supporting and fixing the circulation box, by means of which the circulation box can be mounted on the robot, or wheels are arranged at the bottom of the circulation box, and the robot is connected to the circulation box by means of a cable to drag the circulation box to move. The specific connection is not limited in the embodiment.

Figure 4:
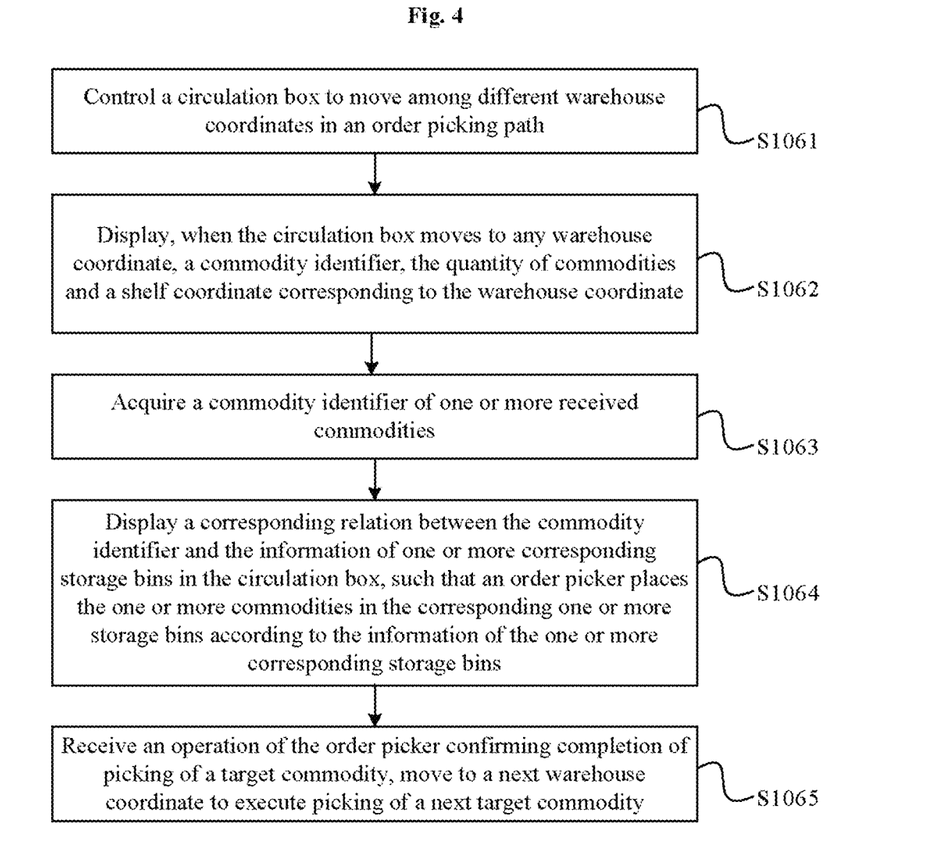
FIG. 4 is a schematic flowchart of a commodity picking method provided in an embodiment of the present disclosure.

In this embodiment, picking of the target commodity is completed by the robot with the help of an order picker, or by the robot alone. With reference to FIG. 4, the process of picking the target commodity specifically includes the following operations.

At S1061, the circulation box is controlled to move among different warehouse coordinates in the order picking path. In an exemplary implementation of the present disclosure, when the robot moves to the designated position of a target commodity to be picked up, prompt information may be sent to the order picker, and the prompt information may be used for prompting the order picker to pick the commodity from the position.

The designated position of the target commodity to be picked up may be a position of a shelf where the target commodity is located, or a position of the target commodity, etc. The prompt information may be in various forms, for example, a buzzer whistling form, a voice broadcast form or a light flashing form.

At S1062, when the circulation box moves to any warehouse coordinate, a commodity identifier, the quantity of commodities and a shelf coordinate corresponding to the warehouse coordinate are displayed.

The target commodity information and the position information corresponding to the plurality of pieces of order information are displayed on a display interface of the robot, wherein the display interface may be an inherent display panel of the robot or a display panel of a terminal device (the terminal device establishes communication connection with the robot to achieve interaction between the terminal device and the robot).

The displayed information may be: a commodity identifier, the quantity (number) of the commodity, a shelf coordinate, etc.

At S1063, a commodity identifier of one or more received commodities is acquired.

At S1064, a corresponding relation between the commodity identifier and the information of one or more corresponding storage bins in the circulation box is displayed, such that an order picker places the one or more commodities in the corresponding one or more storage bins according to the information of the one or more corresponding storage bins.

Figure 5:
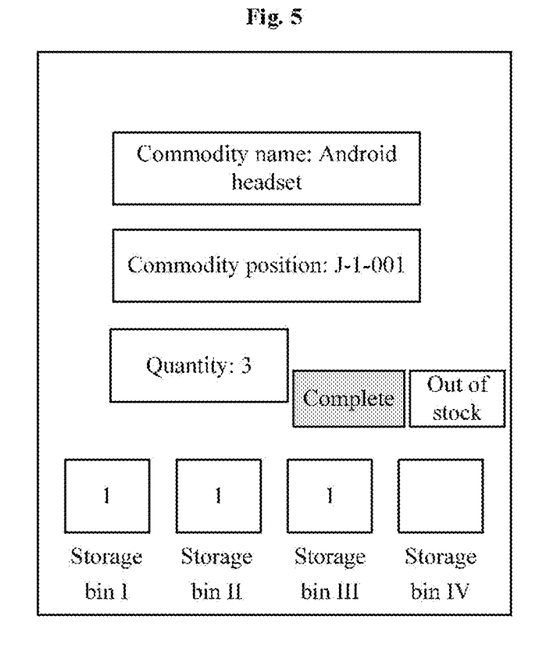
FIG. 5 is a schematic diagram of display information of a display interface involved in an embodiment of the present disclosure.

Further, as shown in FIG. 5, the display interface of the robot may display the name, position, and quantity of the commodity, and may also display the picture of the commodity (the picture of the commodity may be displayed on the display interface in the form of background display) and information prompting the order picker to place the commodities in the corresponding storage bin(s). Displaying of the picture of the target commodity and the information prompting the order picker to place the commodities in the storage bin(s) may be triggered by the order picker by placing the commodity identifier (such as bar code) of the picked commodity in front of the code scanner of the robot for code scanning, and then the quantity of commodities needing to be placed in each storage bin is displayed at the information of the storage bin shown in FIG. 5.

For example, when the robot moves to an order picking position of commodity e, three orders in the four pieces of order information contain the commodity e, and the quantity of commodities e is 3, so the display interface of the robot may display that the name of the commodity e is: Android headset, the position of the commodity is JT-001 (indicating information of a shelf where the commodity is stored), the quantity of commodities e is three, one commodity needs to be placed in storage bin I, another one commodity needs to be placed in storage bin II and the last one commodity needs to be placed in storage bin III (correspondingly, order information A, order information B and order information C each include one commodity e).

At S1065, an operation of the order picker confirming completion of picking of a target commodity is received, and the robot moves to a next warehouse coordinate to execute picking of a next target commodity.

After the order picker places the target commodities in the corresponding storage bin(s), the order picker may trigger the completion button on the display interface to notify the robot that the current picking operation of the target commodity is completed, and the robot queries path information to the position of the next target commodity to be picked up, moves to the next place and executes picking of the next target commodity.

In an exemplary implementation of the present disclosure, except for the order picker assisting the robot in picking operation, the robot may independently execute the picking operation, which specifically includes: the target commodity is placed in one or more corresponding storage bins according to the target commodity information, the position information and the information of the one or more corresponding storage bins.

At S107, in a case where a target commodity is out of stock, at least one piece of order information corresponding to the target commodity out of stock is determined.

At S108, the at least one order information corresponding to the target commodity out of stock is sent to a warehouse management system.

Figure 6:
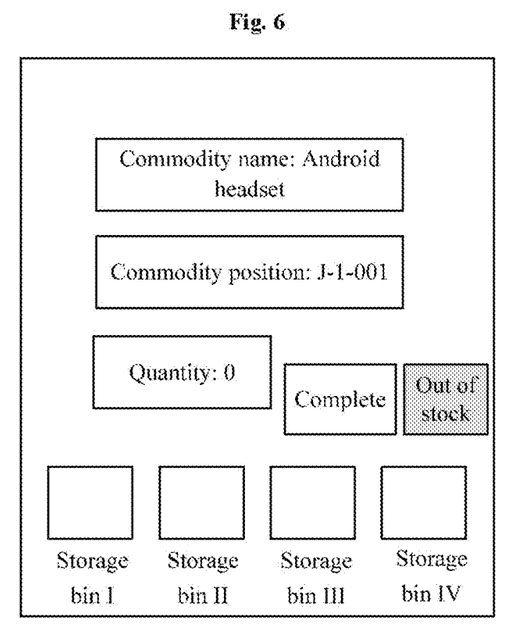
FIG. 6 is a schematic diagram of display information of another display interface involved in an embodiment of the present disclosure.

As shown in FIG. 6, in a case where the target commodity in the commodity warehouse is out of stock, the order picker may set the target commodity to an out-of-stock state by triggering an out-of-stock button on the display interface, the robot determines order information containing the target commodity, cancels picking of the order information and sends the order information to the warehouse management system, so as to notify a deliveryman to deliver the target commodity out of stock, and after the target commodity is delivered, the order picking task of the above order is executed.

According to the order picking solution provided by the embodiments of the present disclosure, after a plurality of pieces of order information and information of storage bins in a circulation box are acquired, the plurality of pieces of order information are associated with the information of the storage bins in one-to-one correspondence, and each storage bin may be used for accommodating all commodities corresponding to one order, which omits the trouble of combining the plurality of orders and sorting after the order picking, saves on labor, and improves efficiency.

Position information of all commodities, corresponding to the plurality of pieces of order information, in the commodity warehouse is acquired, an order picking path is determined according to the commodity information and the position information, a robot is adopted to achieve order picking in place of a picking personnel, and the order picker only needs to wait, beside a commodity shelf, for the robot to bring the circulation box, then picks up commodities according to the displayed commodity information and position information of the commodities to be picked, and places the commodities into the corresponding storage bins of the circulation box to complete commodity picking. Compared with an order picking solution in the related art, the present disclosure saves on time and labor, and improves the efficiency.

Figure 7:
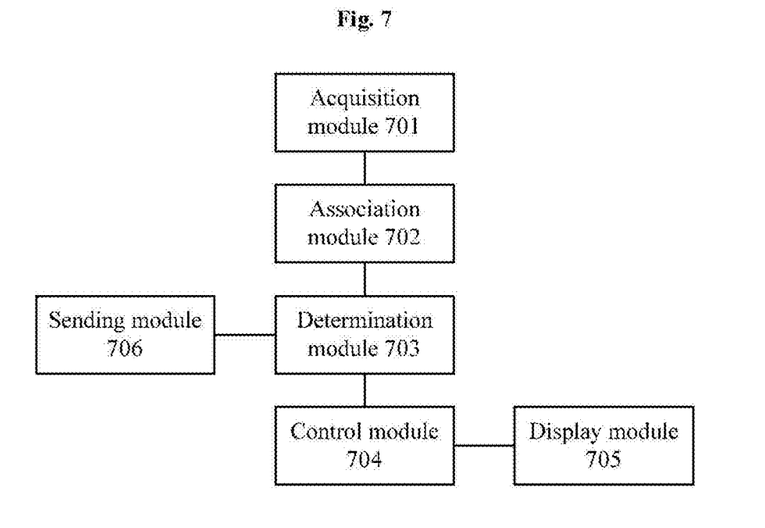
FIG. 7 is a schematic structural diagram of an order picking apparatus provided in an embodiment of the present disclosure.

FIG. 7 is a schematic structural diagram of an order picking apparatus provided in an embodiment of the present disclosure. As shown in FIG. 7, the apparatus includes an acquisition module 701, an association module 702, a determination module 703 and a control module 704.

The acquisition module 701 is configured to acquire a plurality of pieces of order information, wherein each piece of order information comprises information of at least one commodity.

The acquisition module 701 is further configured to acquire information of storage bins in a circulation box, wherein a plurality of storage bins are arranged in the circulation box.

The association module 702 is configured to associate the plurality of pieces of order information with the information of the storage bins, wherein the at least one piece of order information is in one-to-one correspondence with the information of the at least one storage bin.

The acquisition module 701 is further configured to acquire position information of all commodities, corresponding to the plurality of pieces of order information, in a commodity warehouse.

The determination module 703 is configured to determine an order picking path according to commodity information and the position information.

The control module 704 is configured to move the circulation box in the commodity warehouse according to the order picking path for commodity picking.

In an exemplary implementation, the commodity information includes a commodity identifier, and the position information includes a warehouse coordinate. The determination module 703 is configured to search for warehouse coordinates corresponding to all commodity identifiers corresponding to the plurality of pieces of order information through the warehouse management system, and connect the warehouse coordinates corresponding to all commodity identifiers in series according to a preset path to obtain the order picking path.

In an exemplary implementation, the commodity information includes the quantity of commodities, and the position information further includes a shelf coordinate.

The control module is configured to control the circulation box to move among different warehouse coordinates in the order picking path.

The apparatus further includes a display module 705 configured to display, when the circulation box moves to any warehouse coordinate, a commodity identifier, the quantity of commodities and a shelf coordinate corresponding to the warehouse coordinate, acquire a commodity identifier of one or more received commodities, and display a corresponding relation between the commodity identifier and the information of one or more corresponding storage bins in the circulation box, such that an order picker places the one or more commodities in the corresponding one or more storage bins according to the information of the one or more corresponding storage bins.

The control module is further configured to place the one or more received commodities in the one or more corresponding storage bins, corresponding to the commodity identifier, in the circulation box.

In an exemplary implementation, the determination module 703 is configured to determine, in a case where a target commodity is out of stock, at least one piece of order information corresponding to the target commodity out of stock.

The apparatus further includes: a sending module 706 configured to send the at least one order information corresponding to the target commodity out of stock to a warehouse management system.

In an exemplary implementation, the association module 702 is configured to select, in a case where the number of pieces of order information is greater than the number of the storage bins of the circulation box, multiple pieces of order information of which the number is consistent with the number of the storage bins from the plurality of pieces of order information in a preset sequence, and associate the plurality of pieces of order information with the information of the storage bins.

In an exemplary implementation, the information of each storage bin at least includes one of: a two-dimensional code identifier, a serial number identifier, a color identifier, and a graphic identifier.

The order picking device provided by the embodiment may be an order picking apparatus as shown in FIG. 7, which may execute all of the operations of the order picking method as shown in FIG. 1, thereby achieving the technical effects of the order picking method shown in FIG. 1. Please refer to the description about FIG. 1 for further details, which are not repeated herein for brevity of the description.

Figure 8:
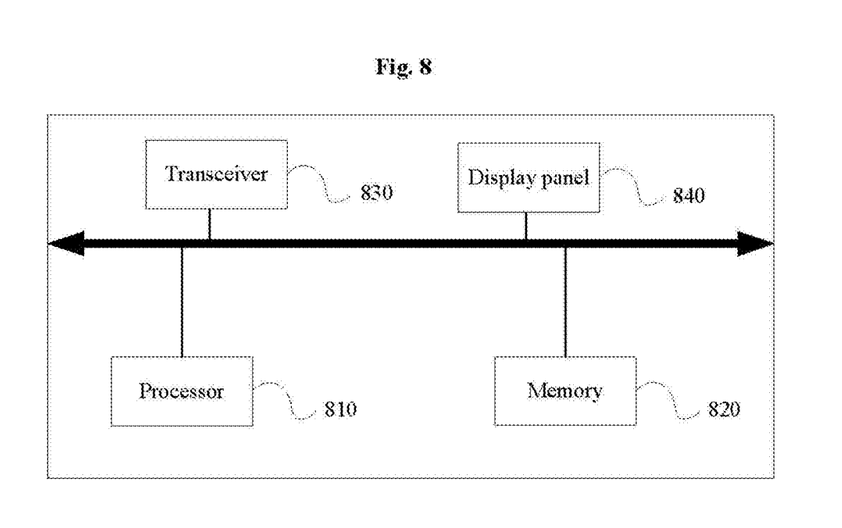
FIG. 8 is a schematic hardware structural diagram of an order picking device provided in an embodiment of the present disclosure.

FIG. 8 is a schematic hardware structural diagram of an order picking device provided in an embodiment of the present disclosure. As shown in FIG. 8, the order picking device includes:

a processor 810, a memory 820, a transceiver 830, and a display panel 840.

The processor 810 may be a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 820 is used for storing various applications, operating systems and data. The memory 820 may transmit the stored data to the processor 810. The memory 820 may include a volatile memory, a nonvolatile random access memory (NVRAM), a phase change random access memory (PRAM), a magnetoresistive random access memory (MRAM), etc., for example, at least one disk storage device, an electronically erasable programmable read-only memory (EEPROM) and a flash memory device, for example, a NOR flash memory or a NAND flash memory and a semiconductor device, and for example, a solid state disk (SSD), etc. The memory 820 may also include a combination of the aforementioned types of memory.

The transceiver 830 is used for transmitting and/or receiving data, and the transceiver 830 may be an antenna, etc.

The display panel 840 is used for displaying and/or receiving the data, the display panel 840 may be a display screen, etc.

An operating process of each device is described as follows.

The processor 810 is configured to acquire a plurality of pieces of order information, wherein each piece of order information comprises information of at least one commodity.

The processor 810 is further configured to acquire information of storage bins in a circulation box, wherein a plurality of storage bins are arranged in the circulation box.

The processor 810 is further is configured to associate the plurality of pieces of order information with the information of the storage bins, wherein the at least one piece of order information is in one-to-one correspondence with the information of the at least one storage bin.

The processor 810 is further configured to acquire position information of all commodities, corresponding to the plurality of pieces of order information, in a commodity warehouse.

The processor 810 is further configured to determine an order picking path according to commodity information and the position information.

The processor 810 is further configured to move the circulation box in the commodity warehouse according to the order picking path for commodity picking.

In an exemplary implementation, the commodity information includes a commodity identifier, and the position information includes a warehouse coordinate. The processor 810 is configured to search for warehouse coordinates corresponding to all commodity identifiers corresponding to the plurality of pieces of order information through the warehouse management system, and connect the warehouse coordinates corresponding to all commodity identifiers in series according to a preset path to obtain the order picking path.

In an exemplary implementation, the commodity information includes the quantity of commodities, and the position information further includes a shelf coordinate. The processor 810 is configured to control the circulation box to move among different warehouse coordinates in the order picking path.

The display panel 840 is configured to display, when the circulation box moves to any warehouse coordinate, a commodity identifier, the quantity of commodities and a shelf coordinate corresponding to the warehouse coordinate, acquire a commodity identifier of one or more received commodities, and display a corresponding relation between the commodity identifier and the information of one or more corresponding storage bins in the circulation box, such that an order picker places the one or more commodities in the corresponding one or more storage bins according to the information of the one or more corresponding storage bins.

In an exemplary implementation, the processor 810 is further configured to place the one or more received commodities in one or more corresponding storage bins, corresponding to the commodity identifier, in the circulation box.

In an exemplary implementation, the processor 810 is configured to determine, in a case where a target commodity is out of stock, at least one piece of order information corresponding to the target commodity out of stock.

The transceiver 830 is configured to send the at least one order information corresponding to the target commodity out of stock to a warehouse management system.

In an exemplary implementation, the processor 810 is configured to select, in a case where the number of pieces of order information is greater than the number of the storage bins of the circulation box, multiple pieces of order information of which the number is consistent with the number of the storage bins from the plurality of pieces of order information in a preset sequence, and associate the plurality of pieces of order information with the information of the storage bins.

In an exemplary implementation, the processor 810 is further configured to configure the information of each storage bin to include at least one of a two-dimensional code identifier, a serial number identifier, a color identifier, and a graphic identifier.

The robot provided by the embodiment may be an order picking device as shown in FIG. 8, which may execute all of the operations of the order picking method as shown in FIG. 1, thereby achieving the technical effects of the order picking method shown in FIG. 1. Please refer to the description about FIG. 1 for further details, which are not repeated herein for brevity of the description.

The operations of a method or algorithm described in connection with the embodiments disclosed herein may be implemented in hardware, in a software module executed by a processor, or in a combination of both. The software module may be placed in a random access memory (RAM), a memory, a read-only memory (ROM), an electrically programmable ROM, an electrically erasable programmable ROM, registers, a hard disk, a removable disk, a CD-ROM, or any other form of storage medium known in the art.

The objective, the technical solution and the beneficial effects of the embodiments of the present disclosure are further explained in detail by means of the exemplary implementations described above, and it should be understood that the above mentioned are only specific implementations of the present disclosure and are not intended to limit the scope of protection of the present disclosure. Any modifications, equivalent substitutions and improvements within the principles of the present disclosure are intended to be included within the scope of protection of the present disclosure.

INDUSTRIAL APPLICABILITY

According to the order picking method and device, and the storage medium provided by the embodiments of the present disclosure, after a plurality of pieces of order information and information of storage bins in a circulation box are acquired, the plurality of pieces of order information are associated with the information of the storage bins in one-to-one correspondence, and each storage bin may be used for accommodating all commodities corresponding to one order, which omits the trouble of combining the plurality of orders and sorting after the order picking, saves on labor, and improves efficiency. In addition, position information of all commodities, corresponding to the plurality of pieces of order information, in the commodity warehouse is acquired, an order picking path is determined according to target commodity information and the position information, a robot is adopted to achieve order picking in place of a picking personnel, and the order picker only needs to wait, beside a commodity shelf, for the robot to bring the circulation box, then picks up commodities according to the displayed commodity information and position information of the commodities to be picked, and places the commodities into the corresponding storage bins of the circulation box to complete commodity picking, which further saves on time and labor, and improves the efficiency. Therefore, the present disclosure is industrially applicable.

What is claimed is:

1. An order picking method performed by an order picking device, the method comprising:

acquiring at least one piece of order information from a warehouse management system, wherein each piece of order information comprises information of at least one commodity;

acquiring, by a code scanner provided on the order picking device, information of at least one storage bin in a circulation box or information of a circulation box identifier of the circulation box in a code scanning mode, wherein a plurality of storage bins are arranged in the circulation box;

associating the at least one piece of order information with the information of the at least one storage bin, wherein the at least one piece of order information is in one-to-one correspondence with the information of the at least one storage bin; in a case where the number of pieces of order information is greater than the number of the storage bins of the circulation box, multiple pieces of order information of which the number is consistent with the number of the storage bins are selected from the plurality of pieces of order information in a preset sequence and are associated with the information of the storage bins, wherein the preset sequence comprises a time sequence or a user priority sequence; or circulation boxes with different numbers of storage bins are set, and a proper circulation box is selected according to the number of orders;

acquiring position information of all commodities, corresponding to the at least one piece of order information, in a commodity warehouse, wherein the position information comprises a warehouse coordinate;

determining an order picking path according to commodity information and the position information;

moving the circulation box in the commodity warehouse according to the order picking path for commodity picking, wherein the order picking device carries the circulation box to reach, according to the order picking path, the warehouse coordinate corresponding to each commodity to be picked up, and when moving to the warehouse coordinate, the order picking device sends prompt information for prompting an order picker, waiting beside a commodity shelf, to pick the commodity from a designated position, the designated position of the commodity to be picked up is a position of a shelf where the commodity is located or a position of the commodity, and the prompt information is in at least one of a buzzer whistling form, a voice broadcast form or a light flashing form;

receiving a triggering on an out-of-stock button on a display interface performed by the order picker in a case where a target commodity in the commodity warehouse is out of stock, and determining at least one piece of order information corresponding to the target commodity out of stock; and cancelling picking of the at least one order information and sending the at least one order information corresponding to the target commodity out of stock to the warehouse management system.

2. The method according to claim 1, wherein the commodity information comprises a commodity identifier, and determining the order picking path according to the commodity information and the position information comprises:
   searching, through the warehouse management system, for warehouse coordinates corresponding to all commodity identifiers corresponding to the at least one piece of order information; and
   connecting the warehouse coordinates corresponding to all the commodity identifiers in series according to a preset path to obtain the order picking path.

3. The method according to claim 2, wherein the commodity information further comprises the quantity of commodities, and the position information further comprises a shelf coordinate;
   moving the circulation box in the commodity warehouse according to the order picking path for commodity picking comprises:
   controlling the circulation box to move among different warehouse coordinates in the order picking path;
   displaying, when the circulation box moves to any warehouse coordinate, a commodity identifier, the quantity of commodities and a shelf coordinate corresponding to the warehouse coordinate;
   acquiring a commodity identifier of one or more received commodities; and
   displaying a corresponding relation between the commodity identifier and the information of one or more corresponding storage bins in the circulation box, such that an order picker places the one or more commodities in the corresponding one or more storage bins according to the information of the one or more corresponding storage bins.

4. The method according to claim 3, further comprising:
   receiving an operation of the order picker confirming completion of picking of the commodities; and
   moving to a next warehouse coordinate to execute picking of a next commodity.

5. The method according to claim 2, wherein moving the circulation box in the commodity warehouse according to the order picking path for commodity picking further comprises:
   accepting one or more received commodities to be placed, by the order picker, in one or more corresponding storage bins, corresponding to the commodity identifier, in the circulation box.

6. The method according to claim 2, wherein moving the circulation box in the commodity warehouse according to the order picking path for commodity picking comprises:
   placing target commodities in one or more corresponding storage bins according to the commodity information, the position information and the information of the one or more corresponding storage bins.

7. The method according to claim 1, wherein the information of each storage bin comprises at least one of:
   a two-dimensional code identifier, a serial number identifier, a color identifier, and a graphic identifier.

8. The method according to claim 1, wherein a plurality of pieces of information of storage bins and the circulation box identifier of the circulation box are configured on the circulation box.

9. The method according to claim 1, further comprising:
   binding the circulation box to the order picking device.

10. The method according to claim 9, wherein binding the circulation box to the order picking device comprises:
   scanning any one of a plurality of pieces of information of storage bins in the circulation box by means of the code scanner; and
   obtaining information of the circulation box, wherein the information of the circulation box comprises: the number of the storage bins in the circulation box, and the information of storage bin corresponding to each storage bin.

11. The method according to claim 1, wherein acquiring the position information of all commodities, corresponding to the at least one piece of order information, in the commodity warehouse comprises:
   acquiring the position information of all commodities, corresponding to the at least one piece of order information, in the commodity warehouse through a warehouse management system.

12. The method according to claim 1, wherein before acquiring the position information of all commodities, corresponding to the at least one piece of order information, in the commodity warehouse, the method further comprises:
   determining types of all the commodities in the at least one piece of order information.

13. An order picking device, comprising: a processor and a memory, wherein the processor is configured to execute an order picking program stored in the memory to:
   acquire at least one piece of order information from a warehouse management system, wherein each piece of order information comprises information of at least one commodity;
   acquire, by a code scanner provided on the order picking device, information of at least one storage bin in a circulation box or information of a circulation box identifier of the circulation box in a code scanning mode, wherein a plurality of storage bins are arranged in the circulation box;
   associate the at least one piece of order information with the information of the at least one storage bin, wherein the at least one piece of order information is in one-to-one correspondence with the information of the at least one storage bin; in a case where the number of pieces of order information is greater than the number of the storage bins of the circulation box, multiple pieces of order information of which the number is consistent with the number of the storage bins are selected from the plurality of pieces of order information in a preset sequence and are associated with the information of the storage bins, wherein the preset sequence comprises a time sequence or a user priority sequence; or circulation boxes with different numbers of storage bins are set, and a proper circulation box is selected according to the number of orders;
   acquire position information of all commodities, corresponding to the at least one piece of order information, in a commodity warehouse, wherein the position information comprises a warehouse coordinate;
   determining determine an order picking path according to commodity information and the position information;
   move the circulation box in the commodity warehouse according to the order picking path for commodity picking, wherein the order picking device carries the circulation box to reach, according to the order picking path, the warehouse coordinate corresponding to each commodity to be picked up, and when moving to the warehouse coordinate, the order picking device sends prompt information for prompting an order picker, waiting beside a commodity shelf, to pick the commodity from a designated position, the designated position of the commodity to be picked up is a position of a shelf where the commodity is located or a position of the commodity, and the prompt information is in at least one of a buzzer whistling form, a voice broadcast form or a light flashing form;

receive a triggering on an out-of-stock button on a display interface performed by the order picker in a case where a target commodity in the commodity warehouse is out of stock, and determine at least one piece of order information corresponding to the target commodity out of stock; and cancel picking of the at least one order information and send the at least one order information corresponding to the target commodity out of stock to the warehouse management system.

14. The device according to claim 13, wherein the order picking device is a robot.

15. A non-transitory computer storage medium, storing one or more programs, wherein the one or more programs are executable by one or more processors on an order picking device to:

acquire at least one piece of order information from a warehouse management system, wherein each piece of order information comprises information of at least one commodity;

acquire, by a code scanner provided on the order picking device, information of at least one storage bin in a circulation box or information of a circulation box identifier of the circulation box in a code scanning mode, wherein a plurality of storage bins are arranged in the circulation box;

associate the at least one piece of order information with the information of the at least one storage bin, wherein the at least one piece of order information is in one-to-one correspondence with the information of the at least one storage bin; in a case where the number of pieces of order information is greater than the number of the storage bins of the circulation box, multiple pieces of order information of which the number is consistent with the number of the storage bins are selected from the plurality of pieces of order information in a preset sequence and are associated with the information of the storage bins, wherein the preset sequence comprises a time sequence or a user priority sequence; or circulation boxes with different numbers of storage bins are set, and a proper circulation box is selected according to the number of orders;

acquire position information of all commodities, corresponding to the at least one piece of order information, in a commodity warehouse, wherein the position information comprises a warehouse coordinate;

determining determine an order picking path according to commodity information and the position information;

move the circulation box in the commodity warehouse according to the order picking path for commodity picking, wherein the order picking device carries the circulation box to reach, according to the order picking path, the warehouse coordinate corresponding to each commodity to be picked up, and when moving to the warehouse coordinate, the order picking device sends prompt information for prompting an order picker, waiting beside a commodity shelf, to pick the commodity from a designated position, the designated position of the commodity to be picked up is a position of a shelf where the commodity is located or a position of the commodity, and the prompt information is in at least one of a buzzer whistling form, a voice broadcast form or a light flashing form;

receive a triggering on an out-of-stock button on a display interface performed by the order picker in a case where a target commodity in the commodity warehouse is out of stock, and determine at least one piece of order information corresponding to the target commodity out of stock: and cancel picking of the at least one order information and send the at least one order information corresponding to the target commodity out of stock to the warehouse management system.

* * * * *